United States Patent
Hochstetler et al.

(10) Patent No.: US 10,451,163 B2
(45) Date of Patent: Oct. 22, 2019

(54) TRIM RING GEAR FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Loves Park, IL (US); Jessica M. Friedberg, Rockton, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 14 days.

(21) Appl. No.: 15/723,442

(22) Filed: Oct. 3, 2017

(65) Prior Publication Data

US 2019/0101203 A1 Apr. 4, 2019

(51) Int. Cl.
*F16H 48/38* (2012.01)
*F16H 48/06* (2006.01)

(52) U.S. Cl.
CPC .............. *F16H 48/38* (2013.01); *F16H 48/06* (2013.01); *F16H 2048/385* (2013.01)

(58) Field of Classification Search
CPC ......... F16H 2048/385; F16H 2048/382; F16H 48/38; F16H 55/08; F16H 48/10; F16H 48/06; F16H 2055/176; F16H 2048/104; F16H 48/11; F16H 3/72; F16H 55/0806; F16H 55/0826; H02P 2101/30; F05D 2270/061; F05D 2260/406; F05D 2260/40311; F05D 2220/50; F02C 7/32; H02K 7/116; Y10T 74/19972; Y10T 74/19958; Y10T 74/19963; Y10T 74/19949

See application file for complete search history.

(56) References Cited

U.S. PATENT DOCUMENTS 3,576,143 A 4/1971 Baits
9,371,897 B2 * 6/2016 Rademakers ......... F16H 37/082
(Continued)

FOREIGN PATENT DOCUMENTS

EP 2202395 A2 6/2010

OTHER PUBLICATIONS

European Search Report for EP Application No. 18197256.3 dated Feb. 4, 2019.

*Primary Examiner* — Jacob S. Scott
*Assistant Examiner* — Lillian T Nguyen
(74) *Attorney, Agent, or Firm* — Carlson, Gaskey & Olds, P.C.

(57) ABSTRACT

A trim ring gear for use in an integrated drive generator has a ring gear body extending between a first end and a second end. Outer gear teeth are formed on an outer surface, and inner gear teeth are formed on an inner surface. The outer tooth roll angle at A is between 16.0 and 17.5°, at B is between 17.5 and 190°, at C is between 22.0 and 23.5°, and at D is between 23.0 and 24.5°. The inner tooth roll angle at A is between 31.5 and 33.0°, at B is between 30.0 and 31.5°, at C is between 25.5 and 27.0°, and at D is between 24.0 and 25.5°. An integrated drive generator, and a method of replacing the trim ring gear are also disclosed and claimed.

15 Claims, 2 Drawing Sheets

(56) References Cited

U.S. PATENT DOCUMENTS

2010/0327684 A1\* 12/2010 Grosskopf .......... F16H 55/0806
    310/83
2013/0025406 A1  1/2013 Lemmers, Jr. et al.
2014/0366668 A1\* 12/2014 Kajiwara ............ F16H 55/0806
    74/457
2016/0146291 A1\* 5/2016 Prunera-Usach ..... F16H 57/082
    475/331

\* cited by examiner

TRIM RING GEAR FOR INTEGRATED DRIVE GENERATOR

BACKGROUND OF THE INVENTION

This application relates to a trim ring gear which connects a differential in an integrated drive generator to a speed trimming unit.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

The trim ring gear portion faces numerous design challenges.

SUMMARY OF THE INVENTION

A trim ring gear for use in an integrated drive generator has a ring gear body extending between a first end and a second end. There is an inner bore and an outer peripheral surface. A plurality of outer gear teeth are formed on the outer peripheral surface, and a plurality of inner gear teeth are formed on an inner surface of the inner bore. The outer gear teeth have a profile defined by roll angles A-D. The outer tooth roll angle at A is between 16.0 and 17.5°. The outer tooth roll angle at B is between 17.5 and 19.0°. The outer tooth roll angle C is between 22.0 and 23.5°. The outer tooth roll angle at D is between 23.0 and 24.5°. The inner gear teeth have a profile defined by inner tooth roll angles at A-D. The inner tooth roll angle at A is between 31.5 and 33.0°. The inner tooth roll angle at B is between 30.0 and 31.5°. The inner tooth roll angle at C is between 25.5 and 27.0°. The inner tooth roll angle at D is between 24.0 and 25.5°.

An integrated drive generator, and a method of replacing the trim ring gear are also disclosed and claimed.

These and other features may be best understood from the following drawings and specification.

DETAILED DESCRIPTION

Figure 1:
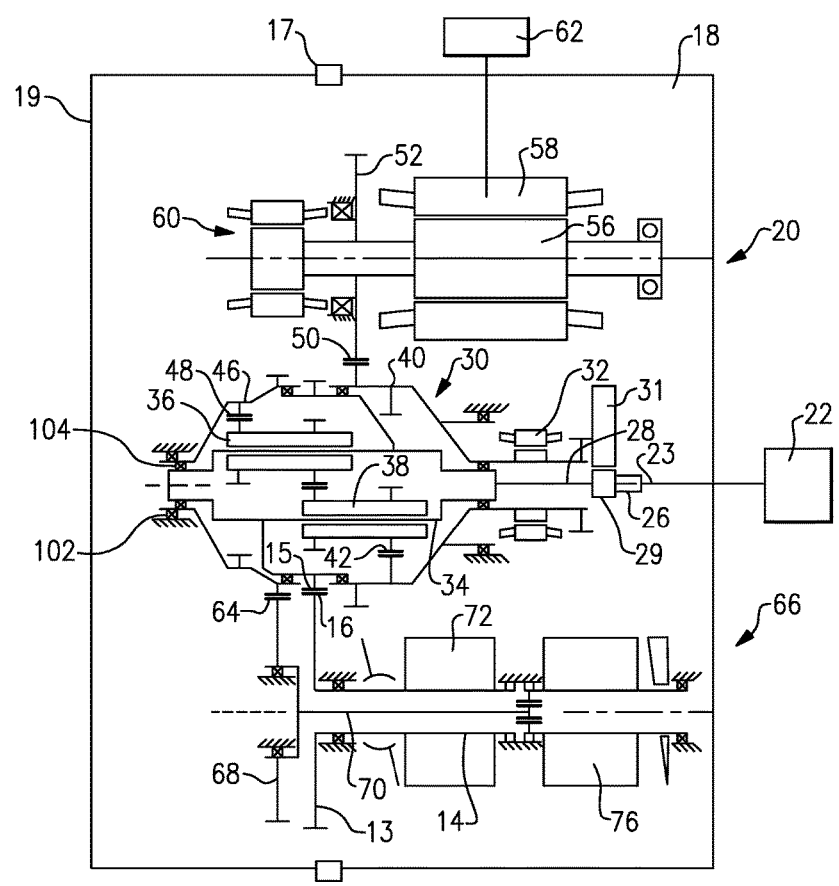
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier 34 in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 64 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the carrier shaft 28 and drives a plurality of accessory gears 31.

The operation of the integrated drive generator 20 is generally as known in the art. A worker of ordinary skill would recognize that the desired frequency and speed at use 62 would dictate a number of design functions.

Ring gear portion 46 is supported, in part, on bearings 102 and 104.

Figure 2:
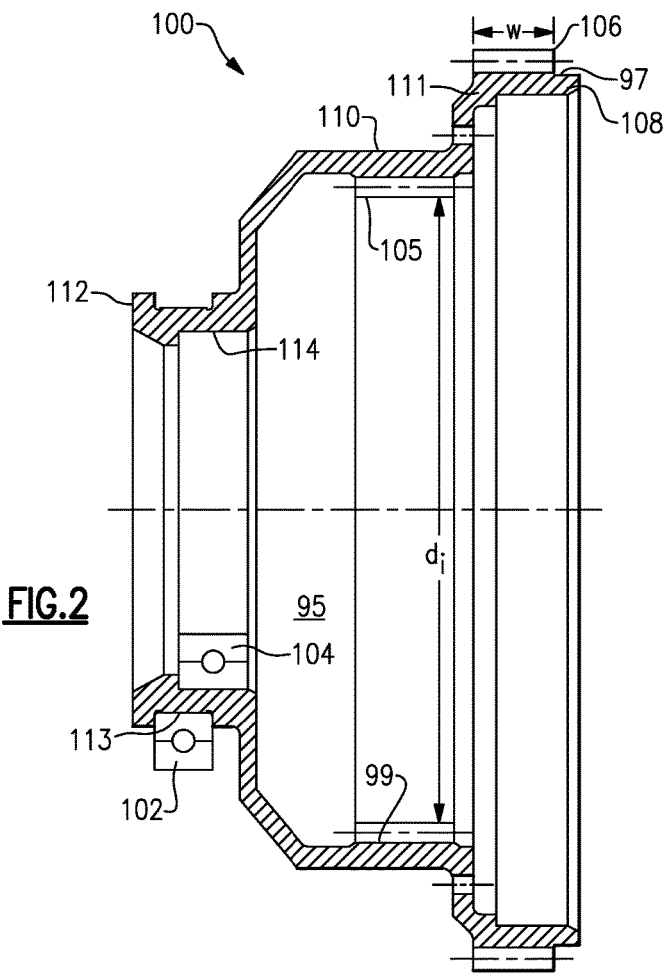
FIG. 2 shows a cross-section through a trim ring gear portion.

FIG. 2 shows a trim ring gear 100 which may be utilized in place of the ring gear portion 46 of FIG. 1. A portion 113 of the trim ring gear provides an inner race for a bearing 102.

Another surface 114 provides an outer race for a bearing 104. Bearings 102 and 104 support the trim ring gear as shown in FIG. 1.

A plurality of inner gear teeth 105 engage with teeth on the planet gears 36, as shown in FIG. 1. Teeth 105 are formed in an inner bore 95 on an inner surface 99 of the inner bore. External or outer gear teeth 106 engage with the gear 68 on the speed trimmer 66, as shown in FIG. 1. Teeth 106 are formed on an outer peripheral surface 97.

The trim ring gear has a body that extends from a forward end 108 through a radially smaller portion 110 and to a rear end 112. The bearings 102 are supported adjacent the rear end 112. The smaller portion 110 is positioned outwardly of the inner gear teeth 105.

The inner teeth 105 are within a radially smaller portion 110 of the trim gear body. The inner teeth 105 are at an axially intermediate location spaced towards the rear end 112 from a radially enlarged portion 111 carrying the outer teeth 106.

Figure 3:
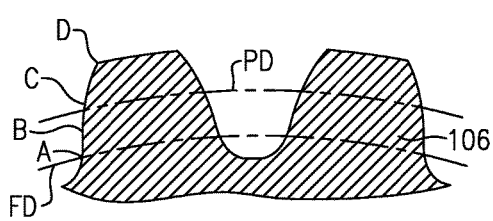
FIG. 3 shows a gear tooth profile for gear teeth engaging a speed trimming system.

As shown in FIG. 3, the outer teeth 106 have a profile defined by four roll angles at A-D (of first through fourth angles). The location of the four roll angles is as generally defined the in gear forming art. A is applied at the form diameter. In this embodiment, the maximum form diameter is 1.76. B is applied at 20% of the entire length of the tooth. C is applied 80° away from A. D is at the outer diameter.

In one embodiment, there are 99 teeth 106 on the trim ring gear 100. The pitch diameter in one embodiment is 4.95 inches (12.6 cm). The diameter to the radially outermost point of the profile in one embodiment is 5.03884 inches (12.78 cm). A root diameter is 4.81 inches (12.2 cm). An axial width W is 0.442 inch (1.12 cm). The tolerance for these diameters can be taken as 0.01 inch (0.03 cm).

The roll angle at A in one embodiment is 16.69 degrees and in embodiments, it is between 16.0 and 17.5°. The roll angle at B is 18.12 degrees and in embodiments, it is between 17.5 and 19.0°. The roll angle at C in one embodiment is 22.43 degrees and in embodiments, it is between 22.0 and 23.5°. The roll angle at D in one embodiment is 23.86 degrees and in embodiments, it is between 23.0 and 24.5°.

Figure 4:
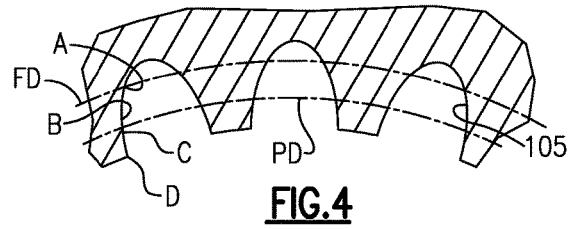
FIG. 4 shows a gear tooth profile for gear teeth engaging gear teeth on a planet gear in a differential.

FIG. 4 shows details of a profile of teeth 105. In one embodiment, there are 70 teeth 105. The pitch diameter is 3.5 inches (8.9 cm) in one embodiment. The diameter to the radially inner end of the profile of gear tooth 105 is 3.54 inches (8.99 cm) in one embodiment. Again, the tolerance was 0.01 inch (0.03 cm).

The roll angle at A was 32.30 degrees in one embodiment and in between 31.5 and 33.0° in embodiments. The roll angle at B was 30.76 degrees in one embodiment and between 30.05 and 31.5° in embodiments. The roll angle at C was 26.14 degrees in one embodiment and between 25.5 and 27.0° in embodiments. The roll angle at D was 24.60 degrees in one embodiment and between 24.0 and 25.5° in embodiments.

In both FIGS. 3 and 4, roll angle A is applied at the form diameter FD. Roll angle B is 20% away from A towards D. The roll angel C is 80% away from roll angle A. The roll angle D is at the end of the tooth profile.

A method of replacing a trim ring gear in an integrated drive generator comprising the steps of removing an existing trim ring gear from an integrated drive generator having an input shaft for driving a carrier shaft in a differential, the carrier shaft for driving two sets of planet gears. A first set of said planet gears is connected for driving a first ring gear portion. A second set of planet gears is connected for driving the existing trim ring gear.

The method includes the steps of inserting a replacement trim ring gear in place of the existing trim ring gear. The replacement trim ring gear has a ring gear body extending between a forward end and a rear end, and having an inner bore and an outer peripheral surface. The ring gear body has a plurality of outer gear teeth on the outer peripheral surface and a plurality of inner gear teeth on an inner surface of the inner bore. The outer gear teeth have a profile defined by roll angles at A-D and wherein the outer tooth roll angle at A is between 16.0 and 17.5°. The outer tooth roll angle at B is between 17.5 and 19.0°. The outer tooth roll angle at C is between 22.0 and 23.5°. The outer tooth roll angle at D is between 23.0 and 24.5°. The inner gear teeth have a profile defined by inner tooth roll angles at A-D, with the inner tooth roll angle at A being between 31.5 and 33.0°, the inner tooth roll angle at B being between 30.0 and 31.5°, the inner tooth roll angle at C being between 25.5 and 27.0°, and the inner tooth roll angle at D being between 24.0 and 25.5°.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A trim ring gear for use in an integrated drive generator comprising:
   a ring gear body extending between a first end and a second end, and having an inner bore and an outer peripheral surface, a plurality of outer gear teeth on said outer peripheral surface and a plurality of inner gear teeth on an inner surface of said inner bore;
   wherein said outer gear teeth have a profile defined by roll angles and wherein a first of said outer tooth roll angles is between 16.0 and 17.5°, a second of said outer tooth roll angles is between 17.5 and 19.0°, a third of said outer tooth roll angles is between 22.0 and 23.5°, and a fourth of said outer tooth roll angles is between 23.0 and 24.5°;
   said inner gear teeth having a profile defined by inner tooth roll angles, with a first of said inner tooth roll angles being between 31.5 and 33.0°, a second of said inner tooth roll angles being between 30.0 and 31.5°, a third of said inner tooth roll angles being between 25.5 and 27.0°, and a fourth of said inner tooth roll angles being between 24.0 and 25.5°; and
   wherein said inner gear teeth are within a radially smaller portion of said ring gear body and said inner gear teeth being at an axially intermediate location spaced towards said second end from a radially enlarged portion carrying said outer gear teeth.

2. The trim ring gear as set forth in claim 1, wherein there are 70 of said inner gear teeth and 99 of said outer gear teeth.

3. The trim ring gear as set forth in claim 2, wherein a nominal pitch diameter for said outer teeth is 4.95 inches (12.6 cm) and a pitch diameter for said inner gear teeth is 3.50 inches (8.9 cm) with a tolerance of 0.01 inch (0.03 cm).

4. The trim ring gear as set forth in claim 3, wherein said ring gear body having an inner bearing surface adjacent said second end and an outer bearing surface adjacent said second end.

5. The trim ring gear as set forth in claim 1, wherein a nominal pitch diameter for said outer teeth is 4.95 inches (12.5 cm) and a pitch diameter for said inner gear teeth is 3.50 inches (8.9 cm) with a tolerance of 0.01 inch (0.03 cm).

6. An integrated drive generator comprising:
an input shaft for driving a carrier shaft in a differential, said carrier shaft driving two sets of planet gears, a first set of said planet gears for driving a first ring gear;
a second set of said planet gears for driving a trim ring gear portion;
said trim ring gear extending between a first end and a second end, and having an inner bore and an outer peripheral surface, a plurality of outer gear teeth on said outer peripheral surface and a plurality of inner gear teeth on an inner surface of said inner bore;
wherein said outer teeth have a profile defined by roll angles at and wherein a first of said outer tooth roll angles is between 16.0 and 17.5°, a second of said outer tooth roll angles is between 17.5 and 19.0°, a third of said outer tooth roll angles is between 22.0 and 23.5°, and a fourth of said outer tooth roll angles is between 23.0 and 24.5°; and
said inner gear teeth having a profile defined by inner tooth roll angles, with a first of said inner tooth roll angles being between 31.5 and 33.0°, a second of said inner tooth roll angles being between 30.0 and 31.5°, a third of said inner tooth roll angles being between 25.5 and 27.0°, and a fourth of said inner tooth roll angles being between 24.0 and 25.5°; and
wherein said inner gear teeth are within a radially smaller portion of said trim ring gear and said inner gear teeth being at an axially intermediate location spaced towards said second end from a radially enlarged portion carrying said outer gear teeth.

7. The integrated drive generator as set forth in claim 6, wherein there are 70 of said inner gear teeth and 99 of said outer gear teeth.

8. The integrated drive generator as set forth in claim 7, wherein a nominal pitch diameter for said outer gear teeth is 4.95 inches (12.57 cm) and a pitch diameter for said inner gear teeth is 3.50 inches (8.89 cm) with a tolerance of 0.01 inch (0.03 cm).

9. The integrated drive generator as set forth in claim 8, wherein said ring gear having an inner bearing surface adjacent said rear end and an outer bearing surface adjacent said second end.

10. The integrated drive generator as set forth in claim 6, wherein a nominal pitch diameter for said outer gear teeth is 4.95 inches (12.5 cm) and a pitch diameter for said inner gear teeth is 3.50 inches (8.89 cm) with a tolerance of 0.01 inch (0.03 cm).

11. A method of replacing a trim ring gear in an integrated drive generator comprising the steps of:
removing an existing trim ring gear from an integrated drive generator having an input shaft connected for driving a carrier shaft in a differential, said carrier shaft connected for driving two sets of planet gears, a first set of said planet gears for driving a first ring gear portion, which in turn is connected to drive a generator rotor, a second set of said planet gears for driving said existing trim ring gear;
inserting a replacement trim ring gear for the existing trim ring gear, the replacement trim ring gear having a ring gear body extending between a first end and a second end, and having an inner bore and an outer peripheral surface, and a plurality of outer gear teeth on said outer peripheral surface and a plurality of inner gear teeth on an inner surface of said inner bore;
said outer gear teeth having a profile defined by roll angles and wherein a first of said outer tooth roll angles is between 16.0 and 17.5°, a second of said outer tooth roll angles is between 17.5 and 19.0°, a third of said outer tooth roll angles is between 22.0 and 23.5°, and a fourth of said outer tooth roll angles is between 23.0 and 24.5°;
said inner gear teeth having a profile defined by inner tooth roll angles, with a first of said inner tooth roll angles being between 31.5 and 33.0°, a second of said inner tooth roll angles being between 30.0 and 31.5°, a third of said inner tooth roll angles being between 25.5 and 27.0°, and a fourth of said inner tooth roll angles being between 24.0 and 25.5°; and
wherein said inner gear teeth are within a radially smaller portion of said trim ring gear and said inner gear teeth being at an axially intermediate location spaced towards said second end from a radially enlarged portion carrying said outer gear teeth.

12. The method of replacing a trim ring gear as set forth in claim 11, wherein there are 70 of said inner gear teeth and 99 of said outer gear teeth.

13. The method of replacing a trim ring gear as set forth in claim 12, wherein a nominal pitch diameter for said outer gear teeth is 4.95 inches (12.6 cm) and a pitch diameter for said inner gear teeth is 3.50 inches (8.89 cm) with a tolerance of 0.01 inch (0.03 cm).

14. The method of replacing a trim ring gear as set forth in claim 13, wherein said trim ring gear having an inner bearing surface adjacent said rear end and an outer bearing surface adjacent said rear end.

15. The method of replacing a trim ring gear as set forth in claim 11, wherein a nominal pitch diameter for said outer gear teeth is 4.95 inches (12.6 cm) and a pitch diameter for said inner gear teeth is 3.50 inches (8.89 cm) with a tolerance of 0.01 inch (0.03 cm).

* * * * *